US007133594B2

(12) United States Patent
Iwasaki et al.

(10) Patent No.: US 7,133,594 B2
(45) Date of Patent: Nov. 7, 2006

(54) DIGITAL RECORDING APPARATUS THAT SECURES A CERTAIN NUMBER OF VIDEO FRAMES IN A VOB CONSTITUTING WITH ANOTHER VOB A PORTION OF ENCODE STREAM THAT SHOULD BE REPRODUCED SEAMLESSLY

(75) Inventors: Shiro Iwasaki, Iizuka (JP); Kojiro Kawasaki, Katano (JP); Hideki Fukuda, Nara (JP); Kazuhiko Nakamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1156 days.

(21) Appl. No.: 09/885,104

(22) Filed: Jun. 21, 2001

(65) Prior Publication Data

US 2002/0031335 A1 Mar. 14, 2002

(30) Foreign Application Priority Data

Jun. 26, 2000 (JP) ............................ 2000-190899

(51) Int. Cl.

| | |
|---|---|
| ***H04N 5/91*** | (2006.01) |
| ***H04N 5/781*** | (2006.01) |
| ***H04N 5/64*** | (2006.01) |
| ***H04N 7/52*** | (2006.01) |
| ***H04N 7/04*** | (2006.01) |

(52) U.S. Cl. ........................ 386/95; 386/131; 386/125; 386/126; 386/101; 386/79; 386/116

(58) Field of Classification Search ................ 386/131, 386/125–126, 95, 68, 70
See application file for complete search history.

(56) References Cited

U.S. PATENT DOCUMENTS

| | | | |
|---|---|---|---|
| 5,107,481 A * | 4/1992 | Miki et al. | 369/53.21 |
| 5,717,468 A * | 2/1998 | Baryla | 725/37 |
| 6,314,235 B1 * | 11/2001 | Gotoh et al. | 386/95 |
| 2002/0008929 A1 * | 1/2002 | Montie et al. | 360/55 |

FOREIGN PATENT DOCUMENTS

EP 0932159 * 7/1999

* cited by examiner

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

A digital recording apparatus that obtains a digital stream including a plurality of frames, while recording the digital stream on a digital recording medium. This apparatus obtains, during recording, an instruction for a procedure in which a recording area is changed to another recording area which is not necessarily continuos with the recording area. When the instruction is obtained, the apparatus executes the procedure only when the number of frames which are recorded in the recording area is a predetermined number or more.

5 Claims, 5 Drawing Sheets

ENCODE STREAM
VOB#1
VOB#2
VOB#i
VOB
VOBU#1
VOBU#2
VOBU#j
VOBU
GOP#1
GOP#2
GOP#k
GOP
Frame#1
Frame#2
Frame#n

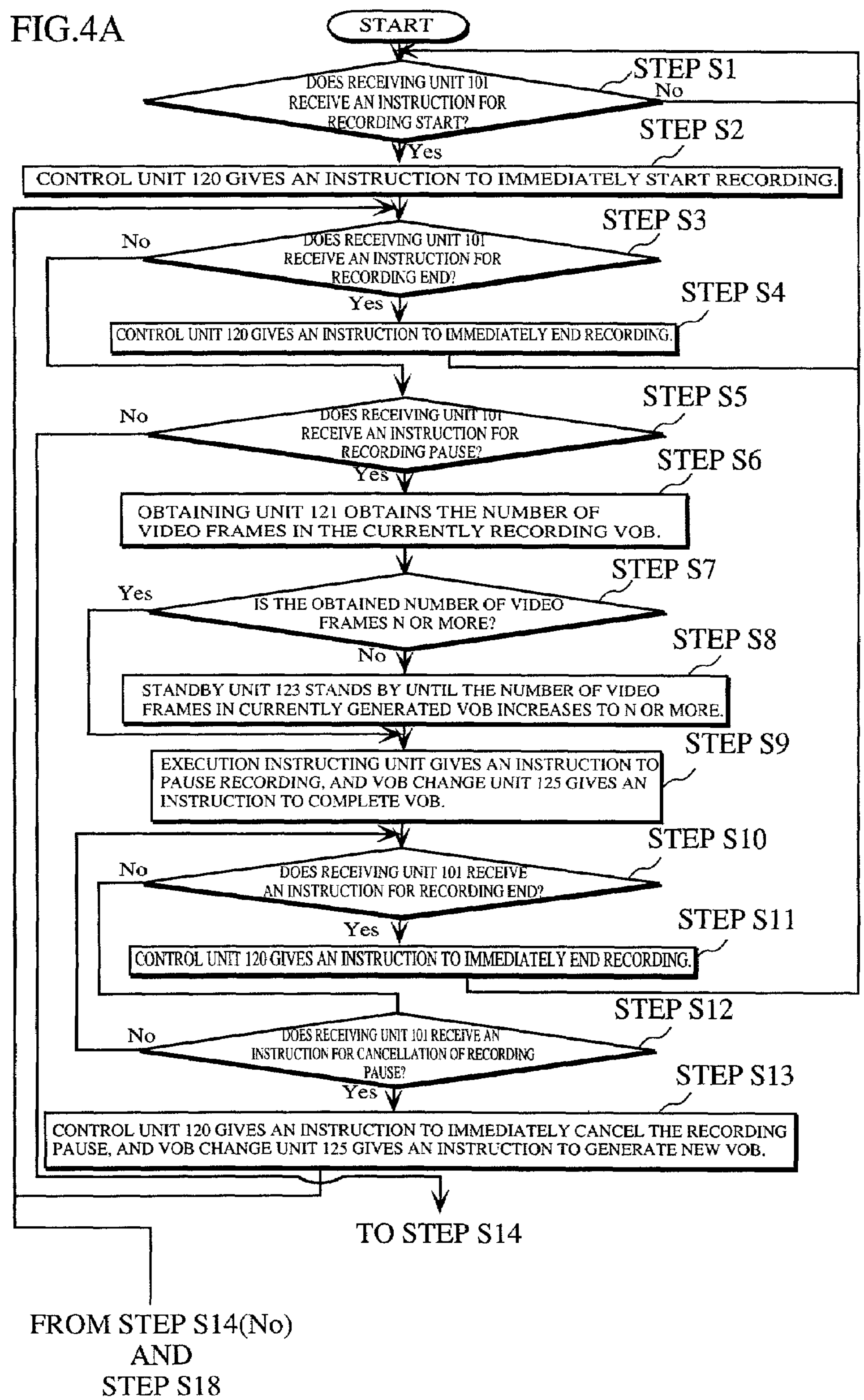

FIG.4A
START
STEP S1
DOES RECEIVING UNIT 101 RECEIVE AN INSTRUCTION FOR RECORDING START?
No
Yes
STEP S2
CONTROL UNIT 120 GIVES AN INSTRUCTION TO IMMEDIATELY START RECORDING.
STEP S3
DOES RECEIVING UNIT 101 RECEIVE AN INSTRUCTION FOR RECORDING END?
No
Yes
STEP S4
CONTROL UNIT 120 GIVES AN INSTRUCTION TO IMMEDIATELY END RECORDING.
STEP S5
DOES RECEIVING UNIT 101 RECEIVE AN INSTRUCTION FOR RECORDING PAUSE?
No
Yes
STEP S6
OBTAINING UNIT 121 OBTAINS THE NUMBER OF VIDEO FRAMES IN THE CURRENTLY RECORDING VOB.
STEP S7
IS THE OBTAINED NUMBER OF VIDEO FRAMES N OR MORE?
Yes
No
STEP S8
STANDBY UNIT 123 STANDS BY UNTIL THE NUMBER OF VIDEO FRAMES IN CURRENTLY GENERATED VOB INCREASES TO N OR MORE.
STEP S9
EXECUTION INSTRUCTING UNIT GIVES AN INSTRUCTION TO PAUSE RECORDING, AND VOB CHANGE UNIT 125 GIVES AN INSTRUCTION TO COMPLETE VOB.
STEP S10
DOES RECEIVING UNIT 101 RECEIVE AN INSTRUCTION FOR RECORDING END?
No
Yes
STEP S11
CONTROL UNIT 120 GIVES AN INSTRUCTION TO IMMEDIATELY END RECORDING.
STEP S12
DOES RECEIVING UNIT 101 RECEIVE AN INSTRUCTION FOR CANCELLATION OF RECORDING PAUSE?
No
Yes
STEP S13
CONTROL UNIT 120 GIVES AN INSTRUCTION TO IMMEDIATELY CANCEL THE RECORDING PAUSE, AND VOB CHANGE UNIT 125 GIVES AN INSTRUCTION TO GENERATE NEW VOB.
TO STEP S14
FROM STEP S14(No) AND STEP S18

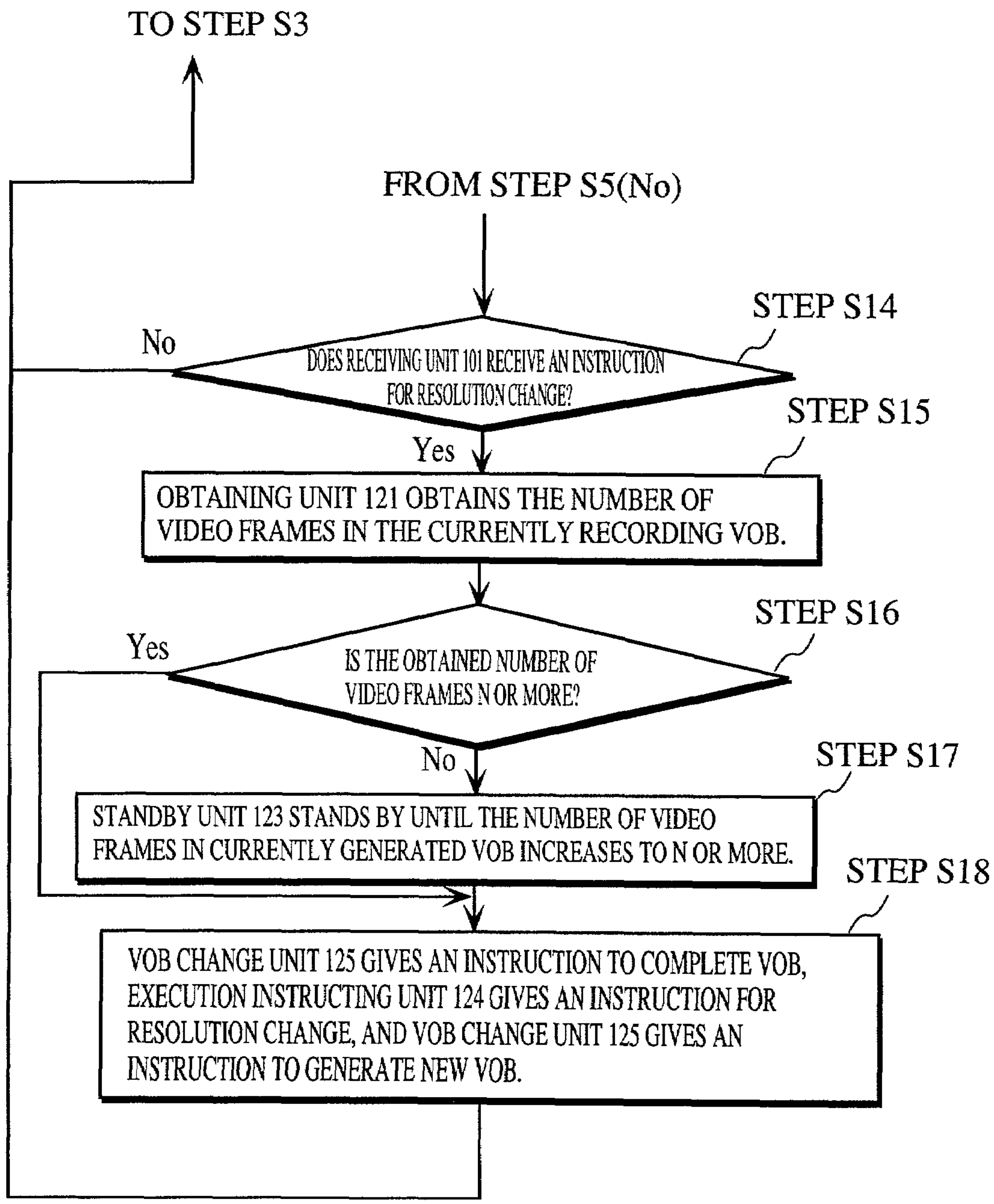
FIG.4B
TO STEP S3
FROM STEP S5(No)
STEP S14
No
DOES RECEIVING UNIT 101 RECEIVE AN INSTRUCTION FOR RESOLUTION CHANGE?
Yes
STEP S15
OBTAINING UNIT 121 OBTAINS THE NUMBER OF VIDEO FRAMES IN THE CURRENTLY RECORDING VOB.
STEP S16
Yes
IS THE OBTAINED NUMBER OF VIDEO FRAMES N OR MORE?
No
STEP S17
STANDBY UNIT 123 STANDS BY UNTIL THE NUMBER OF VIDEO FRAMES IN CURRENTLY GENERATED VOB INCREASES TO N OR MORE.
STEP S18
VOB CHANGE UNIT 125 GIVES AN INSTRUCTION TO COMPLETE VOB, EXECUTION INSTRUCTING UNIT 124 GIVES AN INSTRUCTION FOR RESOLUTION CHANGE, AND VOB CHANGE UNIT 125 GIVES AN INSTRUCTION TO GENERATE NEW VOB.

DIGITAL RECORDING APPARATUS THAT SECURES A CERTAIN NUMBER OF VIDEO FRAMES IN A VOB CONSTITUTING WITH ANOTHER VOB A PORTION OF ENCODE STREAM THAT SHOULD BE REPRODUCED SEAMLESSLY

BACKGROUND OF THE INVENTION (1) Field of the Invention

The present invention relates to a digital recording apparatus that records an encode stream on a digital recording medium such as a DVD-RAM. More specifically, the present invention relates to technology for partitioning an encode stream into a plurality of VOBs and recording the same.

(2) Description of the Related Art

Recently, a DVD recording/playback apparatus having a DVD-RAM with as large as several gigabytes of storage capacity as a recording medium has been put to practical use and has rapidly become widespread. The DVD recording/playback apparatus is based on the Moving Picture Expert Group (MPEG) standard (ISO/IEC13818) and the DVD-VideoRecording Standard (DVD Specifications for Rewritable/Re-recordable Discs., Part3 VIDEO RECORDING) which specify an encoding method for digital audio-visual data.

The MPEG uses a data compression method based on time correlation properties between different pictures, in addition to a conventionally used compression method based on Discrete Cosine Transform (DCT).

The compression method based on the time correlation properties achieves a high compression rate by representing one picture as a difference from corresponding pictures to be reproduced before and after this picture.

Video data is a plurality of sets of still image data (each set of still image data per unit time is hereafter called a video frame), and therefore video data usually contains similar images. As MPEG can provide a high compression rate for video data containing a lot of images similar to one another, MPEG is suitable for compression of video data.

In addition, MPEG can effectively compress data by providing a different compression rate for each image and dynamically assigning a different amount of data to be encoded to each image in accordance with its complexity.

FIG. 1 shows a hierarchical structure of an encode stream which is recorded on a DVD-RAM by means of a DVD recording/playback apparatus.

The encode stream is a set of encoded digital audio-visual data based on the MPEG standard and the DVD-VideoRecording standard.

The MPEG standard defines a Group of Pictures (GOP) hierarchy as follows.

One GOP includes video encode data corresponding to more than one frame and is defined so as to perform a trick play for a video encode stream such as reproduction in a fast-forward mode or in a fast-rewind mode, or a reproduction from a midpoint of the stream. Each picture within a GOP only refers to pictures in the same GOP and therefore a random access within each GOP is possible.

Meanwhile, the DVD-VideoRecording standard defines a Video Object Unit (VOBU) hierarchy and a Video Object (VOB) hierarchy as follows. Here, each encode stream consists of one or more VOBs.

The VOBU includes one or more GOPs and a plurality of pieces of audio data (not shown).

The VOB includes one or more VOBUs which have a piece of encode information in common.

Also, VOB information (VOBI) is recorded for each VOB in the DVD-RAM, in which the encode information is included.

Here, in some procedures of the DVD recording/playback apparatus such as a recording pause and a change in a video resolution during recording, a VOB has to be changed to another VOB to be recorded before and after these procedures.

The recording pause refers to the case where a user presses a pause button during recording to pause the recording and then presses a playback button to cancel the pause and resume the recording, and the case where only commercials are automatically cut in accordance with the difference of sound attributes. In these cases, the apparatus becomes in a standby mode, by which recording can be resumed in a shorter time period than the normal starting mode, and returns to the recording mode.

The change in the video resolution during recording refers to the case where the video resolution is dynamically changed in accordance with the complexity of pictures. This function is for avoiding image degradation by scaling the video resolution down according to the situation, instead of increasing the compression rates for reducing the amount of encoded data, because the latter case causes block noise and mosquito noise which may lead to the significant image degradation.

FIG. 2A shows an example construction of an encode stream when recording is paused and the pause is cancelled.

As shown in this figure, a portion of the encode stream before the recording pause is recorded as VOB#1 and a portion of the encode stream after the cancellation of the pause is recorded as another VOB (i.e., VOB#2).

The following describes the reason why the VOB should be partitioned and recorded before and after the recording pause.

Video Object Information (VOBI) defines an entry "VOB#REC#Time", and a recording start time for one VOB is recorded in this entry which is present at the start of the VOBI. Accordingly, when different portions of an encode stream before and after a recording pause are recorded as one VOB, these portions of the stream have the same "VOB#REC#Time". However, this is not desirable as these portions of the streams do not consist of one continuous period. Therefore, the VOB should be partitioned and recorded in this case.

FIG. 2B shows an example construction of an encode stream when the video resolution is changed during recording.

As shown in this figure, a portion of the encode stream before the change in the video resolution is recorded as VOB#11 and a portion of the encode stream after the change in the video resolution is recorded as another VOB (i.e., VOB#12).

The following describes the reason why the VOB should be partitioned and recorded when a video resolution is changed.

The video resolution is necessary for encoding and is recorded for each VOB unit as VOB information. Here, only one video resolution can be present in one VOB and therefore video resolutions for all frames in the same VOB should be identical with one another. Consequently, the VOB should be partitioned when the video resolution is changed.

It is preferable to seamlessly reproduce pictures at the point of the stream where recording is paused or the video resolution is changed during recording. In the above cases, however, different VOBs which should be reproduced continuously may be separately arranged in the tracks at the inner radius and the outer radius of the DVD-RAM, because a normal DVD recording/playback apparatus records encode stream in units of VOBs. In such an arrangement, if the number of the frames included in the preceding VOB is less than a predetermined number that equals to a time enough not to generate a break of the reproduction due to the seeking time of a reproduction head, then reproduction is suspended for a moment (i.e., a break of the reproduction is generated) and therefore seamless reproduction cannot be realized.

SUMMARY OF THE INVENTION

The object of the present invention is to provide a digital recording apparatus, a digital recording method, and a digital recording program, by which an encode stream is recorded in a digital recording medium such as a DVD-RAM so that seamless reproduction can be assured, while a VOB can be partitioned when recording is paused and the video resolution is changed.

The digital recording apparatus according to the invention, which obtains a digital stream including a plurality of frames, while recording the digital stream on a digital recording medium, is made up of: obtaining means for obtaining, during a recording, an instruction to perform a predetermined procedure in which a recording area for the recording has to be changed from a first recording area to a second recording area which is not necessarily continuous to the first recording area; and execution control means for, in case that the obtaining means obtains the instruction and when the number of frames which are recorded in the first recording area is a predetermined number or more, executing the predetermined procedure, and allowing the recording area to be changed from the first recording area to the second recording area after the execution of the procedure.

With the construction, in case of executing a procedure in which a recording area has to be changed to another discontinuous area before and after the procedure, the procedure can be performed and the recording area can be changed before and after the procedure only when the number of frames recorded in the recording area is the predetermined number or more.

Therefore, the number of frames which are recorded in the recording area which is to be precedently reproduced can be a predetermined number or more. Consequently, seamless reproduction can be assured before and after the execution of the procedure by setting the predetermined number, for example, at not less than the number that equals to a time enough not to generate a break of the reproduction due to the seeking time of a reproduction head in the reproduction apparatus.

In addition, in the above digital recording apparatus, the execution control means includes: execution permitting means for, when the obtaining means obtains the instruction, immediately permitting the execution of the predetermined procedure, in case that the number of the frames which are recorded in the first recording area is the predetermined number or more, and waiting for the number to increase to the predetermined number or more and then permitting the execution of the predetermined procedure, in case that the number is less than the predetermined number; execution means for executing the predetermined procedure when the execution permitting means permits the execution; and recording area changing means for allowing recording on the first recording area to stop before the execution of the predetermined procedure and allowing recording on the second recording area to start after the execution of the procedure.

With this construction, in case that the number of the frames is less than the predetermined number when the instruction is obtained, the apparatus waits for the number to increase to the predetermined number or more and then executes the procedure.

In addition, in the above digital recording apparatus, the digital recording apparatus records the digital stream as one object or partitions the digital stream into a plurality of objects and records the partitioned objects, each of the objects is recorded on a continuous recording area on the digital recording medium, the continuous recording area is not necessarily continuous with the other recording areas, the obtaining means obtains an instruction for a predetermined procedure in which an object has to be partitioned concurrently with the execution of the procedure, and the recording area changing means for allowing a first object being recorded in the first recording area to be completed before the execution of the predetermined procedure and allowing a second object to be recorded on the second recording area after the execution of the predetermined procedure (Hereafter called "apparatus A").

With this construction, in case of executing a procedure in which an object has to be partitioned, the procedure can be executed and the object can be partitioned before and after the execution only when the number of frames included in the object is the predetermined number or more.

Therefore, the number of frames included in the object which is to be precedently reproduced can be the predetermined number or more. Thus, seamless reproduction can be assured before and after the execution of the procedure by setting the predetermined number, for example, at not less than the number that equals to a time enough not to generate a break of the reproduction due to the seeking time of the reproduction head in the reproduction apparatus.

In addition, in the above digital recording apparatus, a video resolution is specified for each frame, all frames included in one object must be a same video resolution, and the instruction includes an instruction that a video resolution of a frame is changed from a first video resolution to a second video resolution during recording, wherein the digital recording apparatus further includes: video resolution recording means for recording information on the first video resolution that is specified for all frames included in the first object before the execution of the predetermined procedure, and recording information on the second video resolution that is specified for all frames included in the second object after the execution of the procedure With this construction, the video resolution can be changed only when the number of the frames included in the object is the predetermined number or more.

Thus, when the object is partitioned in accordance with a change in the video resolution, the number of frames included in the object which is to be precedently reproduced can be the predetermined number or more. Therefore, seamless reproduction can be assured before and after the execution of the procedure by setting the predetermined number, for example, at not less than the number that equals to a time enough not to generate a break of the reproduction due to the seeking time of the reproduction head in the reproduction apparatus.

In addition, in the above digital recording apparatus, it takes a certain amount of time for a reproduction head of a reproduction apparatus to seek an object from another object, when the two objects are continuously reproduced using the reproduction apparatus and are not continuous with each other on the digital recording medium, and the predetermined number specified by the execution control means is not less than a number that is necessary for realizing a seamless reproduction without being influenced by the expected maximum seeking time.

With this construction, the predetermined number can be set at not less than the number that equals to the time enough not to generate a break of the reproduction due to the expected maximum seeking time of the reproduction head.

Therefore, seamless reproduction can be assured before and after the change in the video resolution.

In addition, in the above digital recording apparatus, the digital recording medium is a writable DVD-disk, the digital recording apparatus is a DVD recording apparatus that records a digital video stream on the writable DVD-disk, and the object is a VOB conforming to the DVD-VideoRecording standard.

With this construction, in case of executing a procedure in which a VOB has to be partitioned, the procedure can be executed and the VOB can be partitioned before and after the execution only when the number of frames included in the VOB is the predetermined number or more.

In addition, in the above digital recording apparatus is further made up of: resolution decision means for detecting a value of a high frequency component of the frame, deciding a video resolution in accordance with the value, and in case that the video resolution should be changed, giving the obtaining means an instruction to change the video resolution as the instruction; wherein the execution means changes a video resolution to the video resolution decided by the resolution decision means, when the execution permitting means permits the execution of the procedure.

With this construction, the video resolution can be decided in accordance with the value of the high frequency component in the frame. When the video resolution should be changed, the video resolution can be changed only when the number of the frames included in the object is the predetermined number or more.

Therefore, the video resolution can be dynamically changed in accordance with the complexity of pictures, whereby image degradation is avoided, while the amount of encoded data can be reduced. Furthermore, if the predetermined number is set at not less than the number that equals to a time enough not to generate a break of the reproduction due to the seeking time of the reproduction head in the reproduction apparatus, seamless reproduction can be assured before and after the change in the video resolution.

In addition, in the above apparatus A, the obtaining means includes: receiving means for receiving an instruction for a procedure during recording; and discrimination means for discriminating whether the instruction received by the receiving means is an instruction for the predetermined procedure or an instruction for the other procedures, wherein recording times of all frames included in a same object are continuous, the predetermined procedure includes a recording pause, and the other procedures include cancellation of the recording pause, wherein, when the discrimination means recognizes that the receiving means has received the instruction for the recording pause, the execution permitting means immediately permits the execution of the recording pause, in case that the number of frames included in the first object is the predetermined number or more, and waits for the number to increase to the predetermined number or more and then permits the execution of the recording pause, in case that the number is less than the predetermined number, the execution means allows recording to pause and makes the apparatus a standby mode, when the execution permitting means permits the execution of the recording pause, and allows recording to be resumed, when the discrimination means recognizes that the receiving means has received the instruction for the cancellation of the recording pause during the standby mode, and the recording area changing means allows the first object being recorded on the first recording area to be completed before the execution of the recording pause by the execution means and allows the second object to be recorded on the second recording area after the execution means allows the resumption of recording.

With this construction, recording can be paused only when the number of the frames included in the object is the predetermined number or more.

Thus, when the object is partitioned in accordance with the recording pause, the number of frames included in the object which is to be precedently reproduced can be the predetermined number or more. Consequently, seamless reproduction can be assured before and after the recording pause or cancellation of the pause by setting the predetermined number, for example, at not less than the number that equals to a time enough not to generate a break of the reproduction due to the seeking time of the reproduction head in the reproduction apparatus.

In addition, in the above digital recording apparatus, it takes a certain amount of time for a reproduction head of a reproduction apparatus to seek an object from another object, when the two objects are continuously reproduced using the reproduction apparatus and are not continuous with each other on the digital recording medium, and the predetermined number specified by the execution control means is not less than a number that is necessary for realizing a seamless reproduction without being influenced by the expected maximum seeking time.

With this construction, the predetermined number can be set at not less than the number that equals to the time enough not to generate a break of the reproduction due to the expected maximum seeking time of the reproduction head.

Therefore, seamless reproduction can be assured before and after the recording pause or cancellation of the pause.

In addition, in the above digital recording apparatus, the digital recording medium is a writable DVD-disk, the digital recording apparatus is a DVD recording apparatus that records a digital video stream on the writable DVD-disk, and the object is a VOB conforming to the DVD-VideoRecording standard.

With this construction, in case of executing a procedure in which a VOB has to be partitioned, the procedure can be executed and the VOB can be partitioned before and after the execution only when the number of frames included in the VOB is the predetermined number or more.

A digital recording program according to the invention, which has a computer obtain a digital stream including of a plurality of frames, while recording the digital stream on a digital recording medium, has the computer conduct the following steps of: an obtaining step for obtaining, during a recording, an instruction to perform a predetermined procedure in which a recording area for the recording is changed from a first recording area to a second recording area which is not necessarily continuous to the first recording area; and an execution control step for, in case that the instruction is obtained in the obtaining step and when the number of frames which are recorded in the first recording area is a predetermined number or more, executing the predetermined procedure, and allowing the recording area to be changed from the first recording area to the second recording area after the execution of the procedure.

A digital recording method according to the invention for obtaining a digital stream consisting of a plurality of frames, while recording the digital stream on a digital recording medium includes the following steps of: an obtaining step for obtaining, during a recording, an instruction to perform a predetermined procedure in which a recording area for the recording is changed from a first recording area to a second recording area which is not necessarily continuous to the first recording area; and an execution control step for, in case that the instruction is obtained in the obtaining step and when the number of frames which are recorded in the first recording area is a predetermined number or more, executing the predetermined procedure, and allowing the recording area to be changed from the first recording area to the second recording area after the execution of the procedure.

With the construction, in case of executing an procedure in which a recording area has to be changed to another discontinuous area before and after the procedure, the procedure can be performed and the recording area can be changed before and after the procedure only when the number of frames recorded in the recording area is the predetermined number or more.

Therefore, the number of frames which are recorded in the recording area which is to be precedently reproduced can be a predetermined number or more. Consequently, seamless reproduction can be assured before and after the execution of the procedure by setting the predetermined number, for example, at not less than the number that equals to a time enough not to generate a break of the reproduction due to the seeking time of a reproduction head in the reproduction apparatus.

In addition, in the above digital recording program, the execution control step includes the sub steps of: an execution permitting sub step for, when the obtaining step obtains the instruction, immediately permitting the execution of the predetermined procedure, in case that the number of frames which are recorded in the first recording area is the predetermined number or more, and waiting for the number to increase to the predetermined number or more and then permitting the execution of the predetermined procedure, in case that the number is less than the predetermined number; an execution sub step for executing the predetermined procedure when the execution permitting sub step permits the execution; and a recording area changing sub step for allowing recording on the first recording area to stop before the execution of the predetermined procedure and allowing recording on the second recording area to start after the execution of the procedure.

In the above digital recording method, the execution control step includes the sub steps of: an execution permitting sub step for, when the obtaining step obtains the instruction, immediately permitting the execution of the predetermined procedure, in case that the number of frames which are recorded in the first recording area is the predetermined number or more, and waiting for the number to increase to the predetermined number or more and then permitting the execution of the predetermined procedure, in case that the number is less than the predetermined number; an execution sub step for executing the predetermined procedure when the execution permitting sub step permits the execution; and a recording area changing sub step for allowing recording on the first recording area to stop before the execution of the predetermined procedure and allowing recording on the second recording area to start after the execution of the procedure.

With this construction, in case that the number of the frames is less than the predetermined number when the instruction is obtained, the apparatus waits for the number to increase to the predetermined number or more and then executes the procedure.

In addition, in the above digital recording program, the digital recording program has the computer record the digital stream as one object or partition the digital stream into a plurality of objects and record the partitioned objects, each of the objects is recorded on a continuous recording area on the digital recording medium, the continuous recording area is not necessarily continuous with the other recording areas, the obtaining step obtains an instruction for a predetermined procedure in which an object is partitioned concurrently with the execution of the procedure, and the recording area changing sub step for allowing a first object being recorded in the first recording area to be completed before the execution of the predetermined procedure and allowing a second object to be recorded on the second recording area after the execution of the predetermined procedure.

In the above digital recording method, the digital stream is recorded as one object or the digital stream is partitioned into a plurality of objects and the partitioned objects are recorded, each of the objects is recorded on a continuous recording area on the digital recording medium, the continuous recording area is not necessarily continuous with the other recording areas, the obtaining step obtains an instruction for a predetermined procedure in which an object is partitioned concurrently with the execution of the procedure, and the recording area changing step for allowing a first object being recorded in the first recording area to be completed before the execution-of the predetermined procedure and allowing a second object to be recorded on the second recording area after the execution of the predetermined procedure.

With this construction, in case of executing a procedure in which an object has to be partitioned, the procedure can be executed and the object can be partitioned before and after the execution only when the number of frames included in the object is the predetermined number or more.

Therefore, the number of frames included in the object which is to be precedently reproduced can be the predetermined number or more. Thus, seamless reproduction can be assured before and after the execution of the procedure by setting the predetermined number, for example, at not less than the number that equals to a time enough not to generate a break of the reproduction due to the seeking time of the reproduction head in the reproduction apparatus.

In addition, in the above digital recording program, a video resolution is specified for each frame, all frames included in one object must be a same video resolution, and the instruction includes an instruction that a video resolution of a frame is changed from a first video resolution to a second video resolution during recording, wherein the digital recording program has the computer conduct the further step of: a video resolution recording step for recording information on the first video resolution that is specified for all frames included in the first object before the execution of the predetermined procedure, and recording information on the second video resolution that is specified for all frames included in the second object after the execution of the procedure.

In the above digital recording method, a video resolution is specified for each frame, all frames included in one object must be a same video resolution, and the instruction includes an instruction that a video resolution of a frame is changed from a first video resolution to a second video resolution during recording, wherein the digital recording method further includes the step of: a video resolution recording step for recording information on the first video resolution that is specified for all frames included in the first object before the execution of the predetermined procedure, and recording information on the second video resolution that is specified for all frames included in the second object after the execution of the procedure.

With this construction, the video resolution can be changed only when the number of the frames included in the object is the predetermined number or more.

Thus, when the object is partitioned in accordance with a change in the video resolution, the number of frames included in the object which is to be precedently reproduced can be the predetermined number or more. Therefore, seamless reproduction can be assured before and after the execution of the procedure by setting the predetermined number, for example, at not less than the number that equals to a time enough not to generate a break of the reproduction due to the seeking time of the reproduction head in the reproduction apparatus.

In addition, the above digital recording program has the computer conduct the further step of: a resolution decision step for detecting a value of a high frequency component of the frame, deciding a video resolution in accordance with the value, and in case that the video resolution should be changed, giving an instruction to change the video resolution in the obtaining step as the instruction; wherein, in the execution sub step, a video resolution is changed to the video resolution decided in the resolution decision step, when the execution of the procedure is permitted in the execution permitting sub step.

The above digital recording method further includes a step of: a resolution decision step for detecting a value of a high frequency component of the frame, deciding a video resolution in accordance with the value, and in case that the video resolution should be changed, giving an instruction to change the video resolution in the obtaining step as the instruction; wherein, in the execution sub step, a video resolution is changed to the video resolution decided in the resolution decision step, when the execution of the procedure is permitted in the execution permitting sub step.

With this construction, the video resolution can be decided in accordance with the value of the high frequency component in the frame. When the video resolution should be changed, the video resolution can be changed only when the number of the frames included in the object is the predetermined number or more.

Therefore, the video resolution can be dynamically changed in accordance with the complexity of pictures, whereby image degradation is avoided, while the amount of encoded data can be reduced. Furthermore, if the predetermined number is set at not less than the number that equals to a time enough not to generate a break of the reproduction due to the seeking time of the reproduction head in the reproduction apparatus, seamless reproduction can be assured before and after the change in the video resolution.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 4A and 4B show example procedures of a digital recording/playback apparatus 100 of the embodiment of the invention.

DESCRIPTION OF THE PREFERRED EMBODIMENT

<Summary>

When receiving an instruction for procedures such as a recording pause and a change in the video resolution in which a VOB has to be partitioned, a digital recording apparatus according to the embodiment of the invention allows the procedures to be executed only when the number of frames included in the currently recording VOB is a predetermined number or more. In case that the number is less than the predetermined number, the apparatus waits for the number to increase to the predetermined number or more, and then executes the procedures. Therefore, seamless production can be assured by setting the predetermined number at not less than a number that equals to a time enough not to generate a break of the reproduction due to a time loss during reproduction.

<Construction>

Figure 1:
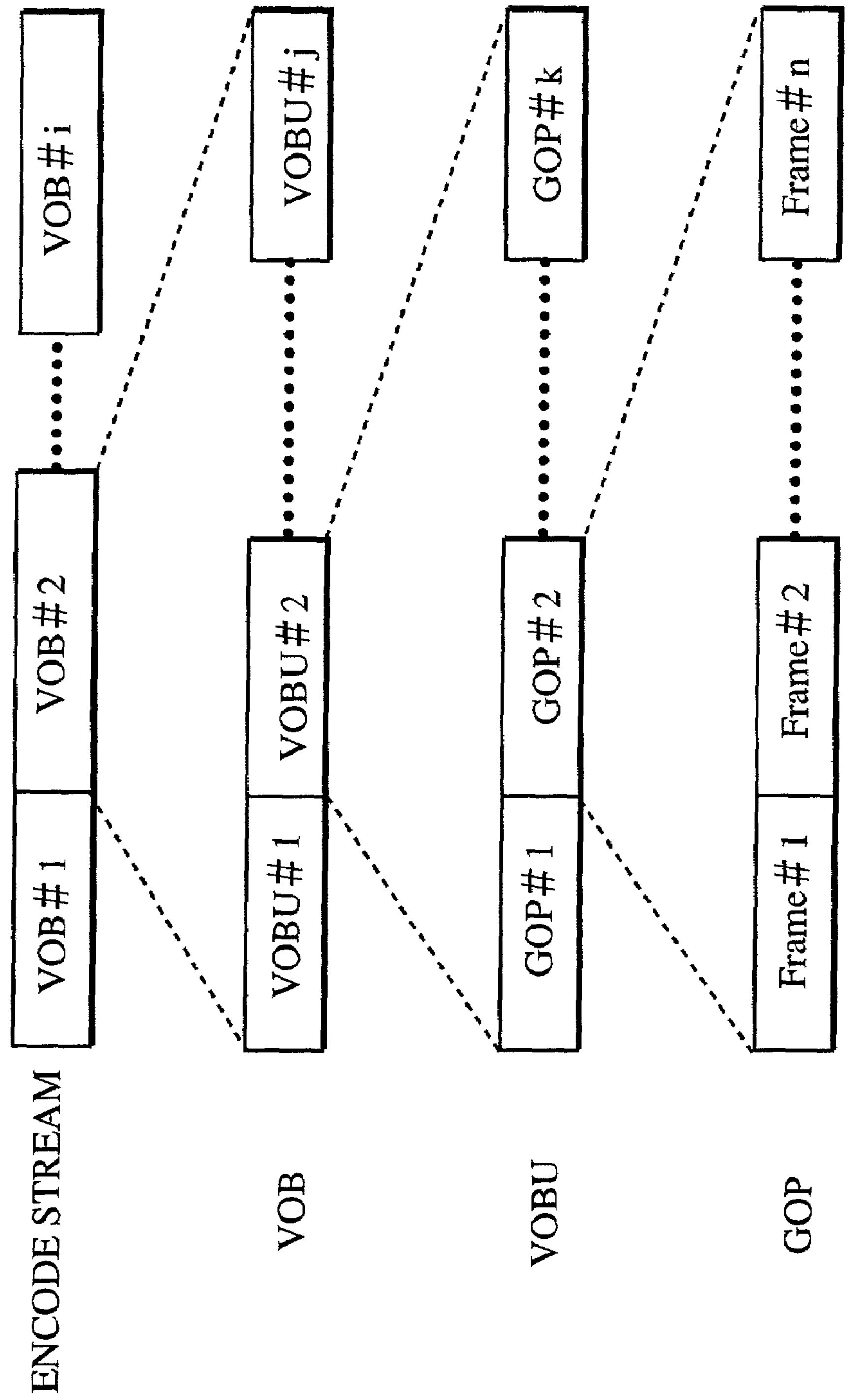
FIG. 1 shows a hierarchical construction of an encode stream which is recorded on a DVD-RAM using a DVD recording/playback apparatus.
Figure 2A:
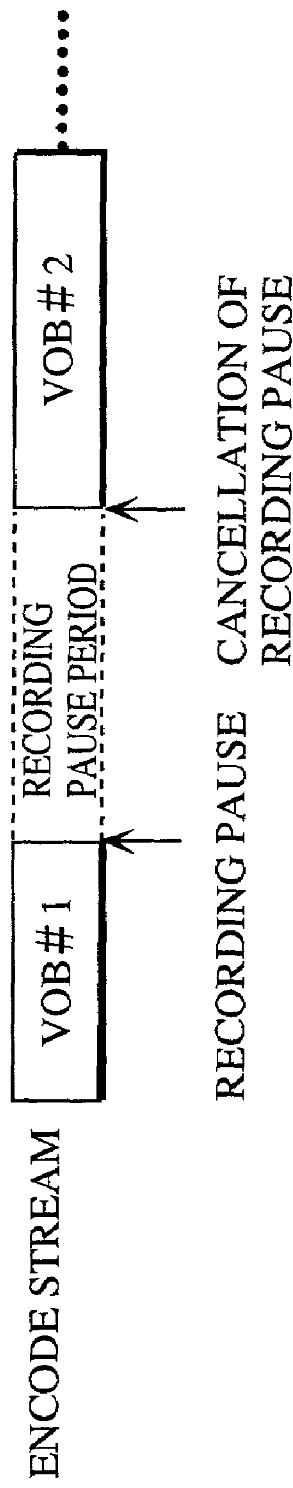
FIG. 2A shows an example construction of an encode stream when recording is paused and the pause is cancelled.
Figure 2B:
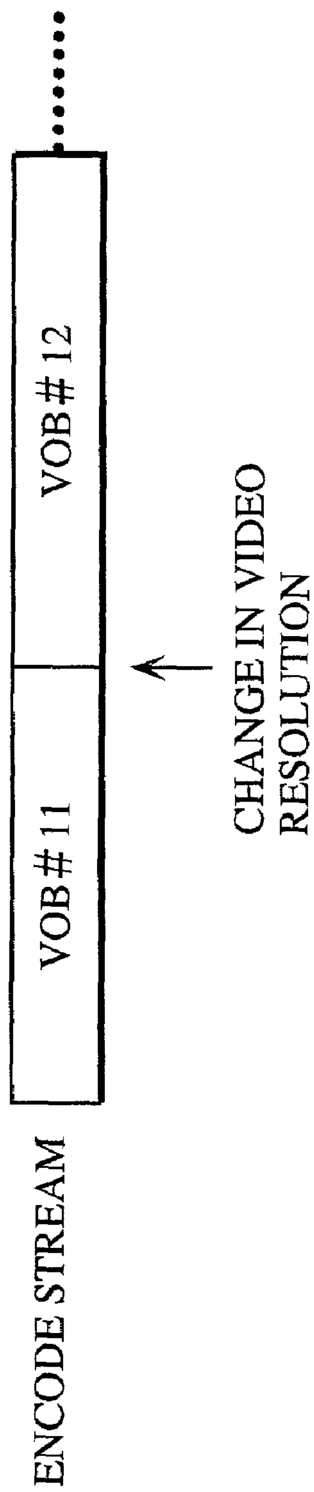
FIG. 2B shows an example construction of an encode stream when the video resolution is changed during recording.
Figure 3:
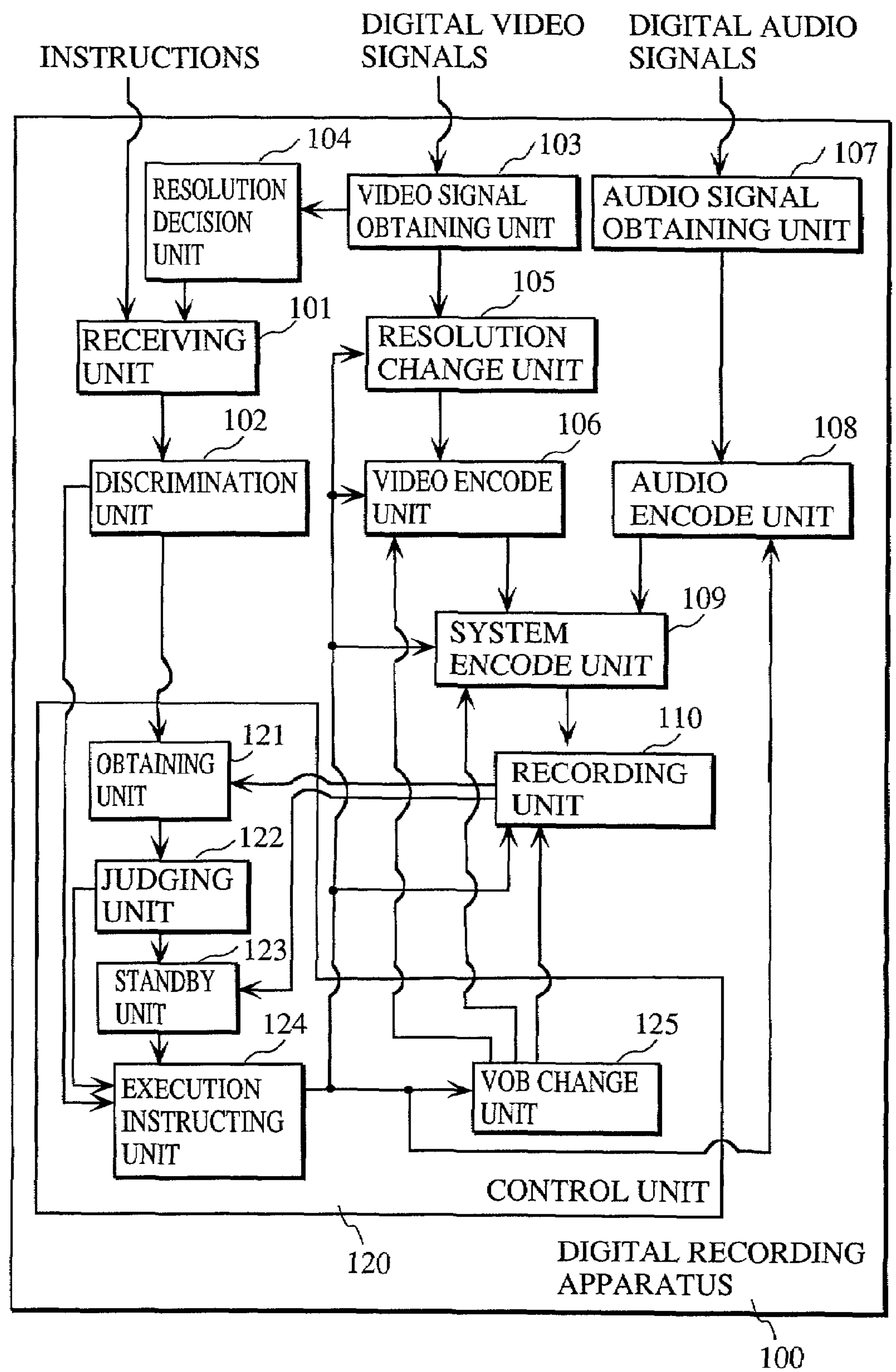
FIG. 3 shows a construction of a digital recording/playback apparatus according to the embodiment of the invention.

FIG. 3 shows a construction of a digital recording apparatus according to the embodiment.

The digital recording apparatus 100 shown in FIG. 3 continuously obtains video data and compresses and encodes the video data, while continuously obtaining audio data and encodes the audio data, multiplexes these data, and continuously records the data on a digital recording medium. This apparatus includes a receiving unit 101, a discrimination unit 102, a video signal obtaining unit 103, a resolution decision unit 104, a resolution change unit 105, a video encode unit 106, an audio signal obtaining unit 107, an audio encode unit 108, a system encode unit 109, a recording unit 110, and a control unit 120.

The receiving unit 101 receives an instruction for a procedure.

For instance, the receiving unit 101 receives instructions for recording start, recording end, recording pause, cancellation of the pause, and resolution change from a user, a recording program apparatus, an automatically commercial cutting apparatus, a copy guard detecting apparatus (all not shown), and so on, and an instruction for resolution change from the resolution decision unit 104.

The discrimination unit 102 discriminates whether or not the procedure according to the instruction received by the receiving unit 101 is the procedure in which a VOB has to be partitioned concurrently with the execution of the procedure.

For instance, the discrimination unit 102 recognizes procedures of recording start, recording end, and cancellation of the recording pause as the procedures in which a VOB does not have to be changed concurrently with the execution of the procedure, while recognizing procedures of recording pause and resolution change as procedures in which a VOB has to be changed concurrently with the execution of the procedure.

The video signal obtaining unit 103 continuously obtains a digital video signal that consists of a plurality of video frames.

The resolution decision unit 104 detects values of high frequency components in the digital video signal obtained by the video signal obtaining unit 103, decides a resolution in accordance with the value, and gives an instruction for a resolution change to the receiving unit 101 only when the resolution should be changed.

The resolution change unit 105 changes a resolution of the digital video signal obtained by the video signal obtaining unit 103 to the resolution decided by the resolution decision unit 104.

The video encode unit 106 encodes the digital video signal outputted from the resolution change unit 105 to generate a video encode stream.

The audio signal obtaining unit 107 continuously obtains a digital audio signal.

The audio encode unit 108 encodes the digital audio signal obtained by the audio signal obtaining unit 107 to generate an audio encode stream.

The system encode unit 109 multiplexes the generated video encode stream and the generated audio encode stream to generate a system encode stream.

The recording unit 110 continuously records the system encode stream generated by the system encode unit 109 on the digital recording medium as a VOB or while partitioning a VOB into a plurality of VOBs. The recording unit 110 further records VOB information including a piece of information on a resolution or the like for each VOB.

The control unit 120 controls the other units so as to perform the procedure that the receiving unit 101 has received. Here, in case of executing a procedure in which a VOB does not have to be partitioned, the control unit 120 controls the other units so as to immediately execute the procedure. While, in case of executing a procedure in which a VOB has to be partitioned, then the control unit 120 controls the other units so as to execute the procedure concurrently with the VOB partition, only when the number of video frames included in the currently recording VOB is a predetermined number N or more.

The value of N that the control unit 120 determines in advance is set at a number or more that equals to a time enough not to generate a break of the reproduction due to the expected maximum seeking time of the reproduction head in the reproduction apparatus, when the reproduction apparatus continuously reproduces different VOBs recorded in two discontinuous recording areas on the digital recording medium.

With respect to the value of N, for example, in case that a reproduction time is 1/30 second for one frame, N is set at approximately 45. In terms of a field, in case that a reproduction time is 1/60 second for one field, N is set at approximately 90.

For instance, when instructions for recording start, recording end, and cancellation of the recording pause are received, the control unit 120 controls the video encode unit 106, the audio encode unit 108, the system encode unit 109, and the recording unit 110 so as to immediately execute these procedures. Meanwhile, when instructions for recording pause and resolution change are received, the control unit 120 controls the video encode unit 106, the audio encode unit 108, the system encode unit 109, and the recording unit 110 so as to execute these procedures only when the number of video frames included in the currently recording VOB becomes N or more.

The control unit 120 includes an obtaining unit 121, a judging unit 122, a standby unit 123, an execution instructing unit 124, and a VOB change unit 125.

The obtaining unit 121 obtains the number of video frames included in the currently recording VOB from the recording unit 110, when a procedure in which a VOB has to be partitioned is received.

The judging unit 122 judges whether or not the number of the video frames included in the currently recording VOB is N or more. If the number is N or more, the judging unit 122 permits the procedures to be executed.

The standby unit 123, in case that the judging unit judges that the number of the video frames is less than N, stands by until the number increases to N or more and then permits the procedures to be executed.

The execution instructing unit 124, when the discrimination unit 102 recognizes the received procedures as the procedure in which a VOB does not have to be partitioned or the judging unit 122/the standby unit 123 permits the received procedures to be executed, performs a control so that the procedures are executed.

The VOB change unit 125, when the judging unit 122/the standby unit 123 permits the received procedures to be executed, controls the video encode unit 106, the system encode unit 109, and the recording unit 110 so as to change a VOB. Here, when changing a VOB, the recording unit 110 records a sequence end code in the currently recording VOB to complete the VOB, generates a new VOB, and records VOB information for each VOB.

For instance, when a new VOB is generated in accordance with the resolution change, the recording unit 110 records VOB information including a piece of information that indicates the resolution before change prior to the resolution change, and records VOB information including a piece of information that indicates the resolution after change when the resolution has been changed.

<Operations>

FIGS. 4A and 4B show an example of operations by the digital recording apparatus 100 according to the embodiment of the invention.

The following describes operations of the apparatus when recording is paused and a resolution is changed with reference to FIGS. 4A and 4B.

(1) During pause, the apparatus waits for the receiving unit 101 to receive an instruction for recording start (Step Si).

(2) When the receiving unit 101 receives the instruction for recording start, the discrimination unit 102 recognizes it as the procedure in which a VOB does not have to be partitioned. Then, the control unit 120 gives an instruction to the video encode unit 106, the audio encode unit 108, the system encode unit 109, and the recording unit 110 so as to immediately start recording (Step S2).

(3) During recording, the apparatus waits for the receiving unit 101 to receive an instruction for recording end (Step S3).

(4) When the receiving unit 101 receives the instruction for recording end, the discrimination unit 102 recognizes it as the procedure in which a VOB does not have to be partitioned. Then, the control unit 120 gives an instruction to the video encode unit 106, the audio encode unit 108, the system encode unit 109, and the recording unit 110 so as to immediately end the recording (Step S4).

(5) During recording, the apparatus waits for the receiving unit 101 to receive an instruction for recording pause (Step S5).

(6) When the receiving unit 101 receives the instruction for recording pause, the discrimination unit 102 recognizes it as the procedure in which a VOB has to be partitioned. Then, the obtaining unit 121 obtains the number of video frames included in the currently recording VOB from the recording unit 110 (Step S6).

(7) The judging unit 122 judges whether the number of video frames obtained by the obtaining unit 121 is N or more (Step S7). In case of the number≧N, the judging unit 122 permits the procedure to be executed.

(8) In case of the number<N, the standby unit 123 stands by until the number of video frames included in the currently generated VOB increases to N or more (Step S8). When the number becomes N or more, the standby unit 123 permits the procedure to be executed.

(9) In case of the number≧N or when the number becomes N or more, the execution instructing unit 124 gives an instruction to the video encode unit 106, the audio encode unit 108, the system encode unit 109, and the recording unit 110 so as to pause recording. Also, the VOB change unit 125 gives an instruction to the video encode unit 106, the system encode unit 109, and the recording unit 110 so as to complete the VOB (Step S9)

(10) During the recording pause, the apparatus waits for the receiving unit 101 to receive an instruction for recording end (Step S10).

(11) When the receiving unit 101 receives the instruction for recording end, the discrimination unit 102 recognizes it as the procedure in which a VOB does not have to be partitioned. Then, the control unit 120 gives an instruction to the video encode unit 106, the audio encode unit 108, the system encode unit 109, and the recording unit 110 so as to immediately end recording (Step S1).

(12) During the recording pause, the apparatus waits for the receiving unit 101 to receive an instruction for cancellation of the pause (Step S12).

(13) When the receiving unit 101 receives the instruction for cancellation of the pause, the discrimination unit 102 recognizes it as the procedure in which a VOB does not have to be partitioned. Then, the control unit 120 gives an instruction to the video encode unit 106, the audio encode unit 108, the system encode unit 109, and the recording unit 110 so as to immediately cancel the recording pause. Also, the VOB change unit 125 gives an instruction to the recording unit 110 so as to generate a new VOB (Step S13).

(14) During recording, the apparatus waits for the receiving unit 101 to receive an instruction for resolution change from the resolution decision unit 104 (Step S14).

(15) When the receiving unit 101 receives the instruction for resolution change, the discrimination unit 102 recognizes it as the procedure in which a VOB has to be partitioned. Then, the obtaining unit 121 obtains the number of video frames included in the currently recording VOB from the recording unit 110 (Step S15).

(16) The judging unit 122 judges whether or not the number of video frames obtained by the obtaining unit 121 is N or more (Step S16). In case of the number≧N, the judging unit 122 permits the procedure to be executed.

(17) In case of the number<N, the standby unit 123 stands by until the number of video frames included in the currently generated VOB increases to N or more (Step S17). When the number becomes N or more, the standby unit 123 permits the procedure to be executed.

(18) In case of the number≧N or when the number becomes N or more, the VOB change unit 125 controls the video encode unit 106, the system encode unit 109, and the recording unit 110 so as to complete the VOB, and the execution instructing unit 124 gives an instruction to the resolution change unit 105 so as to change the resolution. Then, the VOB change unit 125 gives an instruction to the recording unit 110 so as to generate a new VOB (Step S18).

As stated above, the digital recording apparatus according to the invention allows the number of video frames included in the VOB that is generated immediately before recording pause and resolution change to be set at N or more. Therefore, seamless reproduction can be assured by setting the value of N at not less than the number that equals to a time enough not to generate a break of the reproduction due to the seeking time of a reproduction head in the reproduction apparatus.

In the above embodiment, the discrimination process by the discrimination unit 102 and the distinction process by the control unit 120 whether or not the procedure should be immediately performed depend on whether or not the procedure in question requires a VOB partition. However, these processes are not limited to the above cases, but may be for selecting whether or not a recording area should be changed from the continuous recording area to the other area on the digital recording medium.

In addition, in the above embodiment, the resolution decision unit 104 decides a resolution in accordance with values of high frequency components in the digital video signal. However, a resolution may be decided in accordance with high frequency components in the analogue video signal.

In addition, the above embodiment describes the case where the resolution decision unit 104 decides a resolution in accordance with high frequency components in the obtained video signal as one example. However, factors for deciding a resolution is not limited to the high frequency components in the obtained video signal and may be any parameters which reflects one of factors such as complexity of the picture, generated encoding bits, compression rate, amount of the generated noise, and degree of the image degradation.

For instance, the resolution decision unit 104 may decide a resolution in accordance with the value of high frequency components of a video coefficient which is subjected to a DCT transformation by the video encode unit 106. Alternatively, a resolution may be decided in accordance with the generated bits and the buffer remaining amount in the video encode unit 106 and the system encode unit 109.

In addition, in the above embodiment, seamless reproduction can be assured before and after a change in the VOB by setting the number of video frames included in the VOB before change at N or more. A target for setting at N or more is not limited to a video frame, but any data corresponding to a fixed reproduction time may be applicable to the embodiment in the same manner.

Besides, computer programs to have a computer execute the procedure of the above embodiment may be recorded on computer-readable recording media or may be directly transferred on the network to be distributed and sold.

These recording media can be, for example, detachable recording media such as a floppy disk, a compact disk, a magnet optical disk, a DVD disk, and a memory card and fixed recording media such as hard disk, semiconductor memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital recording apparatus that obtains a digital stream including a plurality of frames, while recording the digital stream on a digital recording medium, the digital recording apparatus comprising:

an obtaining unit operable to obtain, during a recording, an instruction to perform a predetermined procedure in which a recording area for the recording has to be changed from a first recording area to a second recording area which is not necessarily continuous to the first recording area; and an execution control unit operable to, in case that the obtaining unit obtains the instruction and when the number of frames which are recorded in the first recording area is a predetermined number or more, (1) execute the predetermined procedure, and (2) allow the recording area to be changed from the first recording area to the second recording area after the execution of the procedure, wherein the digital recording apparatus is operable to record the digital stream as one object or to partition the digital stream into a plurality of objects and record the partitioned objects, wherein each of the objects is recorded on a continuous recording area on the digital recording medium, and the continuous recording area is not necessarily continuous with other recording areas, wherein the obtaining unit includes:

a receiving unit operable to receive an instruction for a procedure during recording; and a discrimination unit operable to discriminate whether the instruction received by the receiving unit is an instruction for the predetermined procedure in which a first object has to be partitioned concurrently with the execution of the procedure, or an instruction for other procedures, wherein recording times off all frames included in a same object are continuous, wherein the predetermined procedure includes a recording pause, and wherein the other procedures include cancellation of the recording pause, wherein the execution control unit includes:

an execution permitting unit operable, when the discrimination unit recognizes that the receiving unit has received the instruction for the recording pause, to (1) immediately permit the execution of the recording pause, in case that the number of frames included in the first object is the predeterminded number or more, and (2) wait for the number of frames included in the first object to increase to the predetermined number or more and then permit the execution of the recording pause, in case that the number frames included in the first object is less than the predetermined number, an execution unit operable to (1) allow recording to pause and make the apparatus enter a standby mode, when the execution permitting unit permits the execution of the recording pause, and (2) allow recording to be resumed, when the discrimation unit recognizes that the receiving unit has received the instruction for the cancellation of the recording pause during the standby mode; and a recording area changing unit operable to allow the first object being recorded on the first recording area to be completed before the execution of the recording pause by the execution unit and to allow the second object to be recorded on the second recording area after the execution unit allows the resumption of recording.

2. The digital recording apparatus of claim 1, wherein it takes a certain amount of time for a reproduction head of a reproduction apparatus to seek an object from another object, when the two objects are continuously reproduced using the reproduction apparatus and are not continuous with each other on the digital recording medium, and wherein the predetermined number specified by the execution control unit is not less than a number that is necessary for realizing a seamless reproduction without being influenced by the expected maximum seeking time.

3. The digital recording apparatus of claim 2, wherein the digital recording medium is a writable DVD-disk wherein the digital recording apparatus is a DVD recording apparatus that records a digital video stream on the writable DVD-disk, and wherein the object is a VOB conforming to the DVD-VideoRecording standard.

4. A digital recording program stored on a computer readable medium that has a computer obtain a digital stream including of a plurality of frames, while recording the digital stream on a digital recording medium, the program having the computer conduct a method comprising the steps of:

(a) an obtaining step of obtaining, during a recording, an instruction to perform a predetermined procedure in which a recording area for the recording is changed from a first recording area to a second recording area which is not necessarily continuous to the first recording area; and (b) an execution control step of, in case that the instruction is obtained in the obtaining step and when the number of frames which are recorded in the first recoding area is a predetermined number or more, (1) executing the predetermined procedure, and (2) allowing the recording area to be changed from the first recording area to the second recording area after the execution of the procedure, wherein the digital recording program is operable to cause the computer to record the digital stream as one object or to partition the digital stream into a plurality of objects and record the partitioned objects, wherein each of the objects is recorded on a continuous recording area on the digital recording medium, and the continuous recording area is not necessarily continuous with other recording areas, wherein the obtaining step includes:

a receiving substep of receiving an instruction for a procedure during recording; and a discrimination substep of discriminating whether the instruction received in the receiving substep is an instruction for the predetermined procedure in which a first object has to be partitioned concurrently with the execution of the procedure, or an instruction for other procedures, wherein recording times of all frames included in a same object are continuous, wherein the predetermined procedure includes a recording pause, and wherein the other procedures include cancellation of the recording pause, wherein the execution control step includes:

an execution permitting substep of, when the discrimination substep recognizes that the instruction for the recording pause has been received in the receiving substep, (1) immediately permitting the execution of the recording pause, in case that the number of frames included in the first object is the predetermined number or more, and (2) waiting for the number of frames included in the first object to increase to the predetermined number or more and then permitting the execution of the recording pause, in case that the number of frames included in the first object is less than the predetermined number;

an execution substep of (1) allowing recording to pause and make the computer enter a standby mode, when the execution permitting substep permits the execution of the recording pause, and (2) allowing recording to be resumed, when the discrimination substep recognizes that the instruction for the cancellation of the recording pause has been received during the standby mode in the receiving substep; and a recording area changing substep of allowing the first object being recorded on the first recording area to be completed before the execution of the recording pause by the execution substep and allowing the second object to be recorded on the second recording area after the execution substep allows the resumption of recording.

5. A digital recording method for obtaining a digital stream consisting of a plurality of frames, while recording the digital stream on a digital recording medium, the digital recording method comprising the steps of:

(a) an obtaining step of obtaining, during a recording, an instruction to perform a predetermined procedure in which a recording area for the recording is changed from a first recording area to a second recording area which is not necessarily continuous to the first recording area; and (b) an execution control step of, in case that the instruction is obtained in the obtaining step and when the number of frames which are recorded in the first recording area is a predtermined number or more, (1) executing the predetermined procedure, and (2) allowing the recording area to be changed from the first recording area to the second recording area after the execution of the procedure, wherein the digital recording method includes recording the digital stream as one object or partitioning the digital stream into a plurality of objects and recording the partitioned objects, wherein each of the objects is recorded on a continuous recording area on the digital recording medium, and the continuous recording area is not necessarily continuous with other recording areas, wherein the obtaining step includes:

a receiving substep of receiving an instruction for a procedure during recording; and a discrimination substep of discriminating whether the instruction received in the receiving substep is an instruction for the predetermined procedure in which a fist object has to be partitioned concurrently with the execution of the procedure, or an instruction for other procedures, wherein recording times of all frames included in a same object are continuous, wherein the predetermined procedure includes a recording pause, and wherein the other procedures include cancellation of the recording pause, wherein the execution control step includes:

an execution permitting substep of, when the discrimation substep recognizes that the instruction for the recording pause has been received in the receiving substep, (1) immediately permitting the execution of the recording pause, in case that the number of frames included in the first object is the predetermined number or more, and (2) waiting for the number of frames included in the first object to increase to the predetermined number or more and then permitting the execution of the recording pause, in case that the number of frames included in the first object is less than the predetermined number;

an execution substep of (1) allowing recording to pause and enter a standby mode, when the execution permitting substep permits the execution of the recording pause, and (2) allowing recording to be resumed, when the discrimination substep recognizes that the instruction for the cancellation of the recording pause has been received during the standby mode in the receiving substep; and a recording area changing substep of allowing the first object being recorded on the first recording area to be completed before the execution of the recording pause by the execution substep and allowing the second object to be recorded on the second recording area after the execution substep allows the resumption of recording.

* * * * *